(12) United States Patent
Knoll et al.

(10) Patent No.: US 8,097,669 B2
(45) Date of Patent: Jan. 17, 2012

(54) FLAME-RETARDANT ELASTIC BLOCK COPOLYMER

(75) Inventors: Konrad Knoll, Mannheim (DE); Maarten Staal, Durham, NC (US); Piyada Charoensirisomboon, Mannheim (DE); Volker Warzelhan, Weisenheim (DE)

(73) Assignee: Styrolution GmbH (DE)

( * ) Notice: Subject to any disclaimer, the term of this patent is extended or adjusted under 35 U.S.C. 154(b) by 0 days.

(21) Appl. No.: 12/668,286

(22) PCT Filed: Jul. 8, 2008

(86) PCT No.: PCT/EP2008/058857
§ 371 (c)(1),
(2), (4) Date: Feb. 25, 2010

(87) PCT Pub. No.: WO2009/007370
PCT Pub. Date: Jan. 15, 2009

(65) Prior Publication Data
US 2010/0184889 A1    Jul. 22, 2010

(30) Foreign Application Priority Data

Jul. 10, 2007  (EP) .................................. 07112183
Sep. 18, 2007  (EP) .................................. 07116636
Sep. 28, 2007  (EP) .................................. 07117513

(51) Int. Cl.
*C08K 5/49*    (2006.01)
*C08K 5/34*    (2006.01)

(52) U.S. Cl. ........................................ 524/115; 524/101

(58) Field of Classification Search .................... 524/115
See application file for complete search history.

(56) References Cited

U.S. PATENT DOCUMENTS

| | | | |
|---|---|---|---|
| 3,280,084 A | 10/1966 | Zelinski et al. | |
| 3,637,554 A | 1/1972 | Childers | |
| 3,985,830 A | 10/1976 | Fetters et al. | |
| 4,091,053 A | 5/1978 | Kitchen | |
| 6,031,053 A * | 2/2000 | Knoll et al. | 525/314 |
| 6,165,399 A | 12/2000 | Guntherberg et al. | |
| 6,177,517 B1 | 1/2001 | Guntherberg et al. | |
| 6,420,442 B1 | 7/2002 | Dietzen et al. | |
| 6,444,714 B1 | 9/2002 | Gluck et al. | |
| 7,893,141 B2 * | 2/2011 | Wit et al. | 524/99 |
| 2005/0075442 A1 * | 4/2005 | Titelman et al. | 524/495 |

FOREIGN PATENT DOCUMENTS

| | | |
|---|---|---|
| DE | 1260135 | 2/1968 |
| DE | 4446896 A1 | 7/1996 |
| EP | 0730000 A1 | 9/1996 |
| EP | 0800554 B1 | 3/1999 |
| GB | 1124911 | 8/1968 |
| WO | WO-96/20248 A1 | 7/1996 |
| WO | WO-98/13412 A1 | 4/1998 |
| WO | WO-00/34342 A2 | 6/2000 |
| WO | WO-00/34367 A2 | 6/2000 |
| WO | WO-03/046071 A1 | 6/2003 |
| WO | WO-2009/007358 | 1/2009 |
| WO | WO-2009/037236 | 3/2009 |
| WO | WO-2009/062923 | 5/2009 |
| WO | WO-2009/074645 | 6/2009 |
| WO | WO-2009/121821 | 10/2009 |

OTHER PUBLICATIONS

Jyung et al., XP-002497056 (KR 203633), Oct. 2004.*
Jyung, et al, "Styrene resin compositions with nonhalogen flame retardant" —Accession No. XP-002497056, 2004, p. 1.
U.S. Appl. No. 12/444,731, filed Apr. 8, 2009.
U.S. Appl. No. 12/668,304, filed Jan. 8, 2010.

* cited by examiner

*Primary Examiner* — Ling Choi
*Assistant Examiner* — Hui Chin
(74) *Attorney, Agent, or Firm* — Connolly Bove Lodge & Hutz LLP

(57) ABSTRACT

The invention relates to a flameproofed resilient block polymer comprising polymerized units of at least one vinylaromatic monomer and at least one diene monomer with at least one flameproofing agent B) which comprises a compound comprising phosphorus, in particular a phosphorus-containing melamine compound, a process for the preparation and the use for the production of moldings.

11 Claims, No Drawings

FLAME-RETARDANT ELASTIC BLOCK COPOLYMER

CROSS-REFERENCE TO RELATED APPLICATIONS

This application is a national stage application (under 35 U.S.C. §371) of PCT/EP2008/058857, filed Jul. 8, 2008, which claims benefit of European application 07112183.4, filed Jul. 10, 2007, European application 07116636.7, filed Sep. 18, 2007 and European application 07117513.7, filed Sep. 28, 2007.

BACKGROUND OF THE INVENTION

The invention relates to a flameproofed resilient block polymer comprising polymerized units of at least one vinylaromatic monomer and at least one diene monomer with at least one flameproofing agent B), a process for the preparation and the use for the production of moldings.

Thermoplastic polymer materials treated with expandable graphite, which is also known as exfoliated graphite, as a flameproofing agent are known. For example, according to WO 03/046071 A1, expandable graphite is used in polystyrene (PS) or high impact polystyrene (HIPS). In addition, according to this document, a halogen-containing compound is required in amounts of from 2 to 11%, calculated as halogen, as a further flameproofing component. However, it is desirable as far as possible substantially to avoid the use of halogen-containing flameproofing agents.

Thermoplastics which are flameproofed without halogen and comprise expandable graphite and a phosphorus compound as flameproofing components are discussed in WO 00/034367 and WO 00/34342. Molding materials based on styrene polymers flameproofed in this manner are, however, worthy of improvement with regard to their dripping behavior in a fire.

KR1996-0001006 discloses flameproofed polystyrene, the flameproofing components comprising expandable graphite, a phosphorus compound and Teflon. The mean particle size of the expandable graphite is 5 μm. The Teflon added as an antidrip agent is used in amounts of from 1 to 5 percent by weight.

Resilient block copolymers likewise flameproofed with exfoliated graphite, a phosphorus compound and a fluorinated polymer are discussed in the European patent applications EP 07112183.4 and EP 07116636.7, the polymer components of the first-mentioned document being acrylonitrile-butadiene-styrene copolymers (ABS) and acrylate-styrene-acrylonitrile copolymers (ASA) and those of the second-mentioned document being PS and HIPS.

Often, in the case of thermoplastic molding materials which are rendered flame-retardant with expandable graphite, it is difficult firstly to achieve sufficient flame retardance and secondly nevertheless to maintain sufficiently good mechanical properties.

In numerous applications in the electrical and electronic area (computers and office equipment, etc.), such as insulations, in the automotive interior area and in the construction sector, flame-retardant materials are prescribed. For corrosion and health reasons, halogen-free solutions for flameproofing are desired. In order to achieve sufficient halogen-free flameproofing at all, combinations of additives, such as exfoliating graphite (intumescent), Teflon dispersions (to prevent dripping), phosphate salts of melamine, red phosphorus (free radical scavenger in the flame), metal hydroxides (water donor), etc. have to be used. The disadvantage of such additives used in considerable proportions by weight is a usually considerable decline in the toughness.

BRIEF SUMMARY OF THE INVENTION

It was the object of the invention to provide a flameproofing system which is self-extinguishing, without adversely affecting the elastomeric, mechanical properties, for elastomers, especially for thermoplastic elastomers, having a soft phase preferably consisting of styrene and butadiene.

The invention relates to a flameproofed resilient block polymer comprising polymerized units of at least one vinylaromatic monomer and at least one diene monomer with at least one flameproofing agent B, wherein the flameproofing agent B) comprises B1) an expandable graphite
B2) a flameproofing compound comprising phosphorus and
B3) a fluorine-containing polymer.

DETAILED DESCRIPTION OF THE INVENTION

In a preferred embodiment, the block copolymers according to the invention may comprise further polymers, in particular thermoplastics, in particular the polymers stated in DE 44 46 896 A1 and the corresponding EP 08 00 554 (WO 96/20248), there under the designation "component P2", preferably semicrystalline polyamides, partially aromatic copolyamides, polyolefins, ionomers, polyesters, polyether ketones, polyoxyalkylenes, polyarylene sulfides and furthermore polyurethanes, noncrystalline copolymers, such as acrylonitrile-butadiene-styrene polymers (ABS), acrylonitrile-styrene-acrylate polymers (ASA), polycarbonates and polycarbonate-polysiloxane block copolymers. Particularly suitable compounds are mentioned in WO 96/20248, from page 11, line 1 to page 24, line 44, and in DE 44 46 896 A1, from page 2, line 53 to page 8, line 10.

The polymers additionally present in this embodiment are preferably used in an amount of less than 50% by weight, based on the sum of the block copolymer according to the invention, the additional polymers and optionally further starting materials; in a further preferred embodiment, the amount is from 5 to 40% by weight.

The resilient block copolymer according to the invention preferably comprises at least one block A having polymerized units of a vinylaromatic monomer and forming a hard phase and/or a block B having diene monomers and forming a first, elastomeric (soft) phase and at least one elastomeric block B/A having polymerized units of a vinylaromatic monomer and of a diene and forming a soft phase, the glass transition temperature $T_g$ of block A being above 25° C. and that of blocks B and/or B/A being below 25° C. and the phase volume ratio of block A to block B/A being chosen so that the proportion of the hard phase, based on the total block copolymer, is 1-40% by volume and the proportion by weight of the diene is less than 50% by weight.

Such an elastomeric block copolymer is obtained by a procedure in which the soft phase is formed from a random copolymer of a vinylaromatic with a diene with compliance with the above parameters; random copolymers of vinylaromatics and dienes are obtained by polymerization in the presence of a polar cosolvent.

A block copolymer according to the invention may be represented, for example, by one of the general formulae 1 to 11:

  (1)

  (2)

  (3)

  (4)

  (5)

  (6)

  (7)

  (8)

  (9)

  (10)

  (11)

in which
A is the vinylaromatic block and
B/A is the soft phase, i.e. the block composed randomly of diene and vinylaromatic units,
X is the radical of an n-functional initiator,
Y is the radical of an m-functional coupling agent and
m and n are natural numbers from 1 to 10.

A preferred block copolymer is one of the general formulae A-B/A-A, X-[-B/A-A]$_2$ and Y-[-B/A-A]$_2$ (meaning of the abbreviations as above) and a particularly preferred block copolymer is one whose soft phase is divided into blocks (12) (B/A)1-(B/A)$_2$; (13)(B/A)$_1$-(B/A)$_2$-(B/A)$_1$; (14)(B/A)$_1$-(B/A)$_2$-(B/A)$_3$; whose vinylaromatic/diene ratio in the individual blocks B/A is different or changes continuously within a block within the limits (B/A)$_1$→(B/A)$_2$, the glass transition temperature $T_g$ of each partial block being below 25° C., preferably below 0° C., in particular below −20° C.

A block copolymer which has a plurality of blocks B/A and/or A with different molar mass per molecule is likewise preferred.

A block B may likewise be present instead of a block A composed exclusively of vinylaromatic units, since all that is important is that an elastomeric block copolymer is formed. Such copolymers may have, for example, the structures (15) to (18): (15) B-(B/A); (16) (B/A)-B-(B/A); (17) (B/A)$_1$-B-(B/A)$_2$; (18)B-(B/A)$_1$-(B/A)$_2$.

In the context of the invention, styrene and furthermore α-methylstyrene and vinyltoluene and mixtures of these compounds are preferred as the vinylaromatic compound. Preferred dienes are butadiene and isoprene and furthermore piperylene, 1-phenylbutadiene and mixtures of these compounds.

A particularly preferred monomer combination is butadiene and styrene. All weight and volume data below are based on this combination; with the use of the technical equivalents of styrene and butadiene, the data must, if appropriate, be correspondingly converted.

The B/A block is composed of about 75-30% by weight of styrene and 25-70% by weight of butadiene. Particularly preferably, a soft block has a proportion of butadiene of from 35 to 70% and a proportion of styrene of from 65 to 30%.

The proportion by weight of the diene in the total block copolymer is 15-65% by weight in the case of the styrene/butadiene monomer combination and that of the vinylaromatic component is accordingly 85-35% by weight. Butadiene-styrene block copolymers having a monomer composition of 25-60% by weight of diene and 75-40% by weight of vinylaromatic compound are particularly preferred.

Preferably, the block copolymers are prepared by anionic polymerization in a nonpolar solvent with addition of a polar cosolvent or alkali metal or alkaline earth metal salt. Aliphatic hydrocarbons, such as cyclohexane or methylcyclohexane, are preferably used as solvents.

The anionic polymerization is preferably initiated by means of organometallic compounds. Compounds of the alkali metals, in particular of lithium, are preferred. Examples of initiators are methyllithium, ethyllithium, propyllithium, n-butyllithium, sec-butyllithium and tert-butyllithium. The organometallic compound is added as a solution in a chemically inert hydrocarbon. The dose depends on the desired molecular weight of the polymer but is as a rule in the range from 0.002 to 5 mol % if it is based on the monomers.

Lewis bases, such as, for example, polar, aprotic compounds, such as ethers and tertiary amines, are preferred for adjusting the copolymerization parameters for the random copolymerization of vinylaromatic and diene. Examples of particularly effective ethers are tetrahydrofuran and aliphatic polyethers, such as diethylene glycol dimethyl ether. Tributylamine and pyridine may be mentioned as tertiary amines. The polar cosolvent is added to the nonpolar solvent in a small amount, e.g. 0.05-5% by volume. Tetrahydrofuran in an amount of 0.1-0.5% by volume is particularly preferred. Experience has shown that an amount of about 0.25-0.3% by volume is sufficient in most cases.

The copolymerization parameters and the proportion of 1,2 and 1,4 linkages of the diene units are determined by the dose and structure of the Lewis base. The polymers have, for example, a proportion of 15-40% of 1,2 linkages and 85-60% of 1,4 linkages, based on all diene units.

In the alkyllithium-initiated polymerization, the addition of alkali metal or alkaline earth metal salts is suitable as an alternative particularly preferred method for the preparation of random vinylaromatic-diene blocks. Potassium is preferred as the alkali metal and barium as the alkaline earth metal. The metals are preferably used as alcoholates, tertiary alcohols having more than 4 carbon atoms being particularly preferred owing to the solubility of the salts in aliphatic hydrocarbons. A preferred example is potassium tert-amylate, the molar lithium/potassium ratio being from 10 to 50, preferably from 30 to 40, with the use of alkylenelithium as an initiator. The advantage of using potassium salts over Lewis bases, such as THF, is that polymerized butadiene units are incorporated to an extent of more than 85% in 1,4 linkages.

The polymerization temperature may be from 0° C. to 130° C.

The temperature range from 30° C. to 100° C. is preferred.

The proportion by volume of the soft phase in the solid is of decisive importance for the mechanical properties.

Preferably, the proportion by volume of the soft phase composed of diene sequences and vinylaromatic sequences is 60-95, preferably 70-90 and particularly preferably 80-90% by volume. The blocks A formed from the vinylaromatic monomers form the hard phase, their proportion by volume accordingly accounts for 5-40, preferably 10-30 and particularly preferably 10-20% by volume.

The proportion by volume of the two phases is measurable by means of high-contrast electron microscopy or solid-state NMR spectroscopy.

The proportion of the vinylaromatic blocks can be determined by osmium degradation of the polydiene fraction by precipitation and weighing.

The future phase ratio of a polymer can also be calculated from the amounts of monomers used if polymerization is allowed to go to completion each time. In the context of the invention, the block copolymer is uniquely defined by the quotient of the proportion by volume in percent of the soft phase formed from the B/A blocks and the proportion of diene units in the soft phase, which is from 25 to 70% by weight for the styrene/butadiene combination.

The glass transition temperature ($T_g$) is influenced by the random incorporation of vinylaromatic compounds into the soft block of the block copolymer and the use of Lewis bases during the polymerization. A glass transition temperature from −50° C. to 25° C., preferably from −50° C. to 0° C., is typical and a glass transition temperature from −50° C. to −20° C. is particularly preferred.

The molecular weight of the block A is in general from 1000 to 200 000, preferably from 5000 to 80 000, particularly preferably from 10 000 to 40 000 [g/mol]. Within a molecule, A blocks may have different molar masses.

The molecular weight of the block B/A is usually from 2000 to 500 000 [g/mol]; values from 10 000 to 300 000 [g/mol] are preferred, particularly preferably from 40 000 to 200 000.

Like block A, block B/A may also assume different molecular weight values within a molecule.

The coupling center X is formed by the reaction of the living anionic chain ends with an at least bifunctional coupling agent. The coupling center is the radical which is incorporated into the polymer after coupling and to which the two chains are bonded. In the case of star polymers, it may also be a plurality of chains. Examples of such compounds are to be found in U.S. Pat. Nos. 3,985,830, 3,280,084, 3,637,554 and 4,091,053. For example, epoxidized glycerides, such as epoxidized linseed oil or soybean oil, are preferably used; divinylbenzene is also suitable. Especially for the dimerization, dichlorodialkylsilanes, dialdehydes, such as terephthalaldehyde, and esters, such as ethyl formate or benzoate, are suitable.

Preferred polymer structures are A-B/A-A, X-[-B/A-A]$_2$ and Y-[-B/A-A]$_2$, it being possible for the random block B/A itself to be again divided into blocks B$_1$/A$_1$-B$_2$/A$_2$-B$_3$/A$_3$-. The random block preferably consists of from 2 to 15 random partial blocks, particularly preferably of from 3 to 10 partial blocks. The division of the random block B/A into as many partial blocks B$_n$/A$_n$ as possible has the decisive advantage that, even in the case of a composition gradient within a partial block B$_n$/A$_n$, as is difficult to avoid in the anionic polymerization under conditions in practice (see below), the B/A block as a whole behaves like a virtually perfect random polymer.

The block copolymers have a property spectrum very similar to flexible PVC but can be prepared completely free of migratable, low molecular weight plasticizers.

A high restoring force on deformation, as is observed in the case of thermoplastic elastomers, a low welding temperature of less than 120° C. and a broad welding range in combination with moderate tack make the block copolymers according to the invention a suitable starting material for the production of cable sheaths, extruded profiles, seals, sealing films, base plates, foams, films, tubes and other extruded, injection molded, thermoformed or blow-molded finished parts for which high toughness in combination with resilience and flame retardance are demanded. The compounds according to the invention are therefore particularly suitable for applications in the area of electrical technology, electronics, in the automotive sector and in the interior finishing of dwellings and buildings.

The polymerization is preferably carried out in a plurality of stages and, in the case of monofunctional initiation, for example, is begun with the preparation of the hard block A. A part of the monomers is initially taken in the reactor and the polymerization is started by adding the initiator. In order to achieve a defined chain structure which can be calculated from the monomer and initiator dose, it is advisable to continue the process to a high conversion (more than 99%) before the second monomer addition is effected. However, this is not absolutely essential.

The sequence of the monomer addition depends on the chosen block structure. In the case of monofunctional initiation, for example, the vinylaromatic compound is first either initially taken or directly metered in. Thereafter, diene and vinylaromatic should be added as far as possible simultaneously. The random structure and the composition of the block B/A are determined by the ratio of diene to vinylaromatic compound, the concentration and chemical structure of the Lewis base or of the further alkali metal or alkaline earth metal salt and the temperature.

Preferably, the diene assumes a proportion by weight of from 25% to 70% relative to the total mass including vinylaromatic compound. Block A can then be polymerized on by addition of the vinylaromatic. Instead, the required polymer blocks can also be linked to one another by the coupling reaction. In the case of bifunctional initiation, the B/A block is first synthesized, followed by the A block.

The further working-up is effected by the customary processes. It is advisable to work in a stirred tank and to protonate the carbanion with an alcohol, such as isopropanol, to establish weakly acidic conditions with $CO_2$/water before the further working-up in the usual way, to stabilize the polymer with antioxidants and free radical scavengers, such as phosphites, in particular trisnonylphenyl phosphite (TNPP), or Irgaphos 168 or sterically hindered phenols, such as, for example, α-tocopherol (vitamin E), or with products obtainable under the trade name Irganox® 1076 or Irganox® 3052 or Irganox® 1010 or Sumilizer® GM and GS, to remove the solvent by the customary methods, to effect extrusion and to effect granulation. The granules can be protected from sticking together, like other rubber types, with an antiblocking agent. A preferred stabilizer combination comprises Irgaphos® 176, Sumilizer® GS and Irganox® 1010.

Flameproofing Agent

The flameproofed block copolymers according to the invention comprise, as component B), a flameproofing agent comprising:

B1) expandable graphite,
B2) a compound comprising phosphorus and
B3) a fluorine-containing polymer.

In a preferred embodiment, the flameproofing agent B is present in an amount of from 20 to 40, in particular from 25 to 40, % by weight, based on the block copolymer including the flameproofing agent and any other additives. In a further preferred embodiment, the proportion of the flameproofing agent is from 28 to 35% by weight.

In a further preferred embodiment, the proportion by weight of the compound B2 comprising phosphorus and of the fluorine-containing polymer B3, based on the block copolymer including the flameproofing agent and any other additives, is together at least 8, in particular at least 10, % by weight.

In a further preferred embodiment, the flameproofing agent comprises
from 20 to 80 parts by weight, based on the total flameproofing agent, of the expandable graphite B1 with an expansion temperature greater than 270° C.
from 20 to 80 parts by weight, based on the total flameproofing agent, of the phosphorus-containing compound B2
from 0.1 to 5 parts by weight, based on the total flameproofing agent, of the fluorinated polymer B3.

Component B1) is the expandable graphite known to the person skilled in the art and described in the literature, so-called exfoliated graphite (heat-expandable graphite). This is derived as a rule from natural or synthetic graphite.

The exfoliated graphite is obtainable, for example, by oxidation of natural and/or synthetic graphite. $H_2O_2$ or nitric acid in sulfuric acid may be used as oxidizing agents.

Furthermore, the exfoliated graphite can be prepared by reduction, for example with sodium naphthalide in an aprotic organic solvent.

Owing to its layer lattice structure, graphite is capable of forming specific forms of intercalation compounds. In these so-called interstitial compounds, foreign atoms or foreign molecules can be taken up in the spaces between the carbon atoms, in ratios which are stoichiometric in some cases.

The surface of the exfoliated graphite can be coated with a coating material, for example with the silane sizes known to the person skilled in the art, for better compatibility with the block copolymer.

Where the exfoliated graphite was obtained by oxidation, it may be necessary to add an alkaline compound since the exfoliated graphite (due to the acid present) may otherwise cause corrosion of the molding materials and/or storage and preparation apparatuses of such molding materials. In particular, alkali metal compounds and $Mg(OH)_2$ or aluminum hydroxides can be added in amounts of up to 10%, preferably up to 5% by weight (based on 100% by weight of B1). Advantageously, the mixing is effected before the components are compounded.

Preferably, the heat expansion of the exfoliated graphite in the case of rapid heating from room temperature to 800° C. (in the direction of the c axis of the crystal) is at least 100 ml/g, preferably at least 110 ml/g (so-called specific volume change).

It is important for the suitability as a flameproofing agent that the exfoliated graphite does not expand to a relatively great extent at temperatures below 270° C., preferably below 280° C. By this, the person skilled in the art understands that the exfoliated graphite experiences a volume expansion of less than 20% at said temperatures in a period of 10 min.

The expansion coefficient (as a specific core variable) means as a rule the difference between the specific volume (ml/g) after heating and the specific volume at 20° C. room temperature. This is generally measured by the following method: a quartz container is heated to 1000° C. in an electrical melting furnace. 2 g of the exfoliated graphite are rapidly introduced into the quartz container and the latter is left in the melting furnace for 10 sec.

The weight of 100 ml of the expanded graphite is measured in order to determine the so-called "loosened apparent specific gravity". The inverse value is then the specific volume at this temperature. The specific volume at room temperature is accordingly measured at 20° C. (Expansion coefficient=specific volume after heating−specific volume at 20° C.).

The median particle diameter, which is also referred to as $D_{50}$ value of the integral volume distribution, is preferably from 10 µm to 1000 µm, preferably from 30 µm to 850 mµ, particularly preferably from 200 µm to 700 µm, before the mixing. If the median particle sizes are lower, a sufficient flameproofing effect is as a rule not achieved; if they are greater, the mechanical properties of the thermoplastic molding materials are usually adversely affected. The density of the exfoliated graphite is usually in the range from 0.4 to 2 g/cm$^3$.

The phosphorus-containing compounds of component B2) are organic and inorganic compounds comprising phosphorus, in which the phosphorus preferably has the valency state from −3 to +5. The valency state is to be understood as meaning the term "oxidation state" as reproduced in the textbook Anorganischen Chemie by A. F. Hollemann and E. Wiberg, Walter des Gruyter and Co. (1964, 57th to 70th edition), pages 166 to 177. Phosphorus compounds of valency states from −3 to +5 are derived from phosphine (−3), diphosphine (−2), phosphine oxide (−1), elemental phosphorus (+0), hypophosphorous acid (+1), phosphorous acid (+3), hypodiphosphoric acid (+4) and phosphoric acid (+5).

Preferred compounds B2) are inorganic or organic phosphate, phosphites, phosphonates, phosphate esters, triphenylphosphine oxide or red phosphorus. Phosphorus compounds having a melamine radical, in particular melamine-modified ammonium polyphosphate, melamine polyphosphate or melamine phosphate, are particularly preferred.

A fluorine-containing polymer is present as component B3). Fluorine-containing ethylene polymers are preferred. These are in particular polymers of ethylene having a fluorine content of from 55 to 76% by weight, preferably from 70 to 76% by weight.

Examples of these are polytetrafluoroethylene (PTFE), tetrafluoroethylene-hexafluoro-propylene copolymers or tetrafluoroethylene copolymers having smaller proportions (as a rule up to 50% by weight) of copolymerizable ethylenically unsaturated monomers. These are described, for example, by Schildknecht in "Vinyl and Related Polymers", Wiley-Verlag, 1952, pages 484 to 494, and by Wall in "Fluoropolymers" (Wiley Interscience, 1972).

These fluorine-containing ethylene polymers preferably have a median particle size D50 in the range from 0.05 to 10 µm, in particular from 0.1 to 5 µm. These small particle sizes can be particularly preferably achieved by using aqueous dispersions of fluorine-containing ethylene polymers and their incorporation into a polymer melt.

Further Components

The block copolymers according to the invention may comprise further additives as a component. In principle, all additives known to a person skilled in the art and described in the literature and customary for plastics are suitable. In the context of the present invention, additives customary for plastics are, for example, stabilizers and antioxidants, compositions for preventing thermal decomposition and decomposition by ultraviolet light, lubricants and demolding agents, dyes and pigments and plasticizers and fibers, for example glass fibers or carbon fibers.

Antioxidants and heat stabilizers which can be added according to the invention are, for example, sterically hindered phenols, hydroquinones, substituted members of this group, secondary aromatic amines, optionally in combination with phosphorus-containing acids and salts thereof, and mixtures of these compounds, preferably in concentrations up to 1% by weight, based on the weight of the thermoplastic molding materials.

Examples of UV stabilizers are various substituted resorcinols, salicylates, benzotriazoles and benzophenones, which are used in general in amounts of up to 2% by weight, based on the weight of the thermoplastic molding materials.

Lubricants and demolding agents, which as a rule can be added in amounts of up to 1% by weight, based on the weight of the copolymers, are stearic acid, stearyl alcohol, alkyl stearates and stearamides and esters of pentaerythritol with long-chain fatty acids. It is also possible to use salts of calcium, of zinc or of aluminum with stearic acid and dialkyl ketones, e.g. distearyl ketone. According to the invention, in particular zinc, magnesium and calcium stearate and N,N'-ethylenebisstearamide are suitable.

Glass fibers which may be used are all glass fibers known to the person skilled in the art and described in the literature (cf. for example Milewski, J. V., Katz, H. S. "Handbook of Reinforcements for Plastics", page 233 et seq., Van Nostrand Reinholt Company Inc, 1987).

Preparation Process:

The block copolymers are preferably prepared by mixing the components as a melt in a screw extruder, the screw extruder comprising at least one metering zone, a plasticizing zone, a homogenization zone and a diskharge zone in this sequence along the conveying direction.

Suitable screw extruders are described, for example, in Saechtling, Kunststoff-Taschenbuch, Hanser Verlag, Munich, Vienna, edition 26, 1995, pages 191 to 246.

Screw extruders usually have sections with different functions, so-called "zones". The different zones of the screw extruders are not necessarily identical to the individual components, such as barrel parts or screw segments, from which the screw extruders are assembled. A zone consists as a rule of a plurality of components. Depending on the function, the individual zones may have different spatial dimensions, for example different lengths or volumes.

Usually, screw extruders have one or more of the zones described below. In addition, however, screw extruders may also have zones whose function is not described explicitly below.

Metering zone is to be understood as meaning the section of a screw extruder in which one or more components, for example a thermoplastically processible polymer, are fed into the screw extruder. This feeding can be effected by a metering apparatus which, for example, consists of a top opening in the screw extruder with attached hopper, so that the component to be metered enters the screw extruder through gravitational force. However, the metering apparatus may also consist, for example, of a conveying screw or an extruder by means of which the component to be metered is forced through the metering opening of the screw extruder.

Plasticizing zone (often also referred to as melting zone) is to be understood as meaning that section of a screw extruder in which a component is brought into a thermoformable, generally molten or plastically deformable, state. As a rule, this is achieved by heating or mechanically input energy. The components familiar to the person skilled in the art, for example screw elements having a small pitch in the conveying direction, kneading blocks having narrow or broad, conveying or further conveying kneading disks, screw elements having a pitch opposite to the conveying direction, or a combination of such elements, are suitable as plasticizing elements for inputting mechanical energy. The choice of the plasticizing elements in the plasticizing zone depends, with regard to their type, number and dimensioning, on the components of the thermoplastic molding materials, in particular on the viscosity and softening temperature and the miscibility of the components.

Homogenization zone is to be understood as meaning that section of a screw extruder in which one or more components, at least one of which is in the thermoformable state, are homogenized. This homogenization is generally effected by mixing, kneading or shearing.

Suitable mixing, kneading and shearing elements are, for example, the means already described as plasticizing elements. In addition, suitable homogenization elements are combinations of conveying, nonconveying and back-conveying kneading blocks, which may consist of narrow or broad kneading disks or combinations thereof. Other suitable homogenization elements are so-called toothed disks, which may also be equipped with conveying or nonconveying teeth, or so-called toothed mixing elements where, for example, the thread is not continuous but consists of a number of teeth; these toothed mixing elements, too, may be conveying or nonconveying.

Further homogenization elements known to the person skilled in the art are so-called SMEs, screws having interrupted threads, blister disks and various types of special elements which are commercially available from various extruder manufacturers.

Diskharge zone is to be understood as meaning that section of a screw extruder in which the diskharge of the thermoplastically processible molding material from the screw extruder is prepared and is carried out through the outlet opening. The diskharge zone generally consists of a conveyor screw and a closed barrel part which is terminated by a defined outlet opening.

A die head which is formed, for example, as die plate or die strip is preferably used as an outlet opening, it being possible for the dies to be circular (hole die plate), slot-like or of another form. The product diskharged as an extrudate in the case of a die plate is cooled and granulated as usual, for example in water. Particularly with the use of a slot die, cube granulation is possible.

If the resilient block copolymers are not initially obtained as granules but are to be further used directly, further processing in the hot state or direct extrusion of sheets, films, tubes and profiles is also advantageous.

A screw extruder can moreover comprise further zones, for example vent or devolatilization zones for removing gaseous constituents or squeeze and dewatering zones for separating off and diskharging a liquid constituent, which may be water but also other substances. Devolatilization, squeeze and dewatering zones and the design and arrangement thereof are described in WO 98/13412, and it is for this reason that reference is made expressly to said document regarding these features.

A section of a screw extruder may also combine two or more of said zones. If, for example, a further substance is metered into the homogenization zone of an extruder, the homogenization zone simultaneously functions as a metering zone. In an analogous manner, the other zones of the said zones can simultaneously be realized in one section of the screw extruder.

The individual zones can be clearly delimited spatially from one another or can have a continuous transition from one to the other. Thus, for example in an extruder, the transition from the plasticizing zone to the homogenization zone cannot always be clearly delimited spatially. There is often a continuous transition between the two zones.

As is generally known, the various zones of a screw extruder can be individually heated or cooled in order to establish an optimum temperature profile along the conveying direction. Suitable heating and cooling apparatuses are known to the person skilled in the art.

The temperatures and spatial dimensions of the individual zones which are to be chosen in the individual case differ depending on the chemical and physical properties of the components and their ratios.

As already described above, a screw extruder which comprises at least one metering zone, a plasticizing zone, a homogenization zone and a diskharge zone in this sequence along the conveying direction is used in the melt mixing process according to the invention.

In an embodiment of the invention, all components of the resilient block copolymers are fed simultaneously, either spatially separately from one another or together, to the metering zone of the screw extruder. It is also possible for individual components of the thermoplastic molding materials—except for the substantial amount of component B1)—to be premixed and fed to the metering zone and then for the remaining components, individually and/or likewise as a mixture, to be added behind this metering zone, viewed in the conveying direction.

It is preferable if the metering of the main amount, preferably of the total amount, of the expandable graphite B1) is effected in the screw extruder at a point behind which—considered in the conveying direction—the extruder screw comprises substantially no shearing elements. Preferably, the extruder screw comprises, behind the metering point, only screw elements which have a substantially conveying effect on the material being extruded.

In principle, the metering of the expandable graphite B1) into the screw extruder can therefore also be effected in the metering zone or the plasticizing zone, provided that the extruder screw comprises substantially no more shearing elements from this addition point of component B1) onward, viewed in the conveying direction. However, it is difficult to obtain homogeneous molding materials in this embodiment of the processes according to the invention.

Advantageously, the metering of the expandable graphite B1) into the screw extruder is therefore effected in the homogenization zone (i.e. the extruder screw can be equipped with shearing elements in the plasticizing zone), particularly preferably between homogenization zone and diskharge zone (i.e. the extruder screw can be equipped with shearing elements in the plasticizing zone and/or the homogenization zone).

The expandable graphite B1) can be added in pure form, but also as a mixture with another component, as a so-called additive batch.

Compared with known molding materials, the block polymers have an improved combination of flame-retardant and mechanical properties.

The invention is illustrated in more detail below with reference to examples.

EXAMPLES

Methods of Measurement:
MVR (220° C./10 kg)
The melt volume-flow ratio (MVR) is measured according to ISO 1133B on a polymer melt at 220° C.
Charpy ak (23° C.)
The Charpy notched impact resistance (ak) is measured at 23° C. according to ISO 179-2/1eA(F) on test specimens (dimensions 80×10×4 mm, produced according to ISO 294).
Charpy an (23° C.)
The Charpy impact resistance was determined according to 350 179 1 eU at 23° C.
Energy to Fracture
Energy to Fracture (E-F)
Fracture energy measured as area under the stress-strain curve.
Modulus of Elasticity
The modulus of elasticity is measured according to ISO 527-2/1A/50 on test specimens produced according to ISO 294.
Average Combustion Times
In the fire test based on UL 94, vertical burning standard, the afterburning time was measured on 2 bars having a thickness of 1.6 mm. The times obtained were averaged.
Starting Materials
Elastomeric Block Copolymer
The following were used as components:

| Component | chemical designation | Specification | Company |
|---|---|---|---|
| A | styrene-butadiene-styrene block copolymer | Styroflex ®2566 | BASF |
| B1 | Exfoliated graphite | Exfoliated graphite Nord-Min ® 503 from Nordmann, Rassmann, GmbH, comprising 8% by weight of intercalated sulfuric acid, having a median particle size $D_{50}$ of 465 μm, a free expansion (beginning at about 300° C.) of at least 150 ml/g and a bulk density of 0.5 g/ml at 20° C. | Nordmann |
| B2 | Melamine polyphosphate | Melapur ®200 | Ciba |
| B3 | Teflon dispersion | PTFE TE-3893 | C. H. Erbslöh |

Extruder
ZSK 30 Twin-Screw Extruder

A ZSK 30 twin-screw extruder from Werner and Pfleiderer, consisting of 11 barrel sections (the counting of the barrel sections begins with 0, the metering zone, and continues in the conveying direction up to 10, the diskharge zone) and an associated pair of screws was used. The external diameter of the screws was 30 mm. All components, except for component B1), were metered into barrel section 0, which was provided with a top metering opening. Barrel sections 2 and 3 comprise the melting zone, so that the material being extruded is present in the molten state on leaving barrel section 3. Component B1) was metered into barrel section 4. The screw in barrel sections 4 to 10 was provided only with conveying elements.

SE-II:

Identical screw extruder to ZSK30, but in barrel section 6 the screw was provided with a mixing element which displays scarcely any shearing effect.

Production of the Molding Materials and Moldings:

For determining the mechanical properties and fire properties, the components were homogenized in the one screw extruder and injection molded to give standard moldings.

Sample Production

Samples for the fire test were produced according to method UL94.

Carrying Out the Tests

The samples were burnt according to UL94. In addition, their mechanical properties were measured. The compositions and the results obtained are evident from the following tables:

Results

| Example 1/ZSK30, twin-screw extruder | | |
|---|---|---|
| Component | % by weight | |
| B1 | 20 | |
| B3 | 1 | |
| B2 | 10 | |
| A | 69 | |
| Test | Unit | Result |
| MVR (200° C./5 kg) | $cm^3$/10 min | 6.7 |
| Charpy ak (23° C.) | $kJ/m^2$ | No break |
| Charpy an (23° C.) | $kJ/m^3$ | 80.2 |
| Breaking stress | MPa | 15.36 |
| Elongation at break | % | 478.32 |
| Yield stress | MPa | 230 |
| Modulus of elasticity | MPa | 230 |
| Energy to fracture (E_F) | $mJ/mm^2$ | 2282.8 |

| Example 2/Midi extruder (DSM) | | |
|---|---|---|
| Component | % by weight | |
| B1 | 20 | |
| B2 | 10 | |
| B3 | 1 | |
| A | 69 | |
| Test | Unit | Result |
| Average burning time | s | 13.5 |

We claim:

1. A flameproofed resilient block polymer comprising polymerized units of at least one vinylaromatic monomer and at least one diene monomer with at least one flameproofing agent B, wherein the flameproofing agent B) comprises
   B1) an expandable graphite,
   B2) a compound comprising phosphorus, and
   B3) a fluorine-containing polymer,
   and wherein the phosphorus-containing compound B2 is a phosphorus compound with a melamine radical.

2. The block copolymer according to claim 1, wherein the block copolymer comprises at least one block A having polymerized units of a vinylaromatic monomer and forming a hard phase and/or a block B having diene monomers and forming a first soft elastomeric phase and at least one elastomeric block B/A having polymerized units of both a vinylaromatic monomer and a diene and forming an optionally second or further soft phase.

3. The block copolymer according to claim 2, wherein the glass transition temperature $T_g$ of block A is above 25° C. and that of block B/A is below 25° C. and the phase volume ratio of block A to block B/A is chosen so that the proportion of the hard phase, based on the total block copolymer, is 1-40% by volume and the proportion by weight of the diene is less than 50% by weight.

4. The block copolymer according to claim 1, wherein the flameproofing agent is present in an amount of from 20 to 40% by weight, based on the block copolymer, including the flameproofing agent and other additives.

5. The block copolymer according to claim 1, wherein the flameproofing agent B comprises:
   from 20 to 80 parts by weight, based on the total flameproofing agent, of the expandable graphite B1 having an expansion temperature of >270° C.,
   from 20 to 80 parts by weight, based on the total flameproofing agent, of the phosphorus-containing compound B2, and
   from 0.1 to 5 parts by weight, based on the total flameproofing agent, of the fluorine-containing polymer B3.

6. The block copolymer according to claim 1, wherein the phosphorus-containing compound B2 is a melamine-modified ammonium polyphosphate, a melamine polyphosphate or melamine phosphate.

7. The block copolymer according to claim 1, wherein the phosphorus-containing compound B2 is a melamine polyphosphate.

8. A process for the preparation of a resilient block copolymer with a flameproofing agent according to claim 1, which comprises mixing the block copolymer with the flameproofing agent in an extruder.

9. A process for the production of moldings which comprises utilizing the resilient block copolymer according to claim 1.

10. A molding based on the resilient block copolymer according to claim 1.

11. The molding according to claim 10 wherein the molding is a film or an extruded profile, tube, cable sheath, sealing material, base plate or a foam.

* * * * *